United States Patent
Shank et al.

(10) Patent No.: US 9,914,333 B2
(45) Date of Patent: Mar. 13, 2018

(54) VEHICLE TRAILER CONNECT SYSTEM

(71) Applicant: UUSI, LLC, Reed City, MI (US)

(72) Inventors: David W. Shank, Hersey, MI (US);
Josh Goulet, Holland, MI (US); John Washeleski, Cadillac, MI (US)

(73) Assignee: UUSI, LLC, Reed City, MI (US)

( * ) Notice: Subject to any disclaimer, the term of this patent is extended or adjusted under 35 U.S.C. 154(b) by 0 days.

(21) Appl. No.: 13/798,478

(22) Filed: Mar. 13, 2013

(65) Prior Publication Data
US 2014/0012465 A1  Jan. 9, 2014

Related U.S. Application Data

(60) Provisional application No. 61/668,079, filed on Jul. 5, 2012.

(51) Int. Cl.
*B60D 1/58* (2006.01)
*B62D 15/02* (2006.01)

(52) U.S. Cl.
CPC ........... *B60D 1/58* (2013.01); *B62D 15/0285* (2013.01)

(58) Field of Classification Search
None
See application file for complete search history.

(56) References Cited

U.S. PATENT DOCUMENTS

| | | | |
|---|---|---|---|
| 5,265,021 A * | 11/1993 | Avitan | 701/41 |
| 6,273,771 B1 * | 8/2001 | Buckley et al. | 440/84 |
| 8,191,915 B2 | 6/2012 | Freese et al. | |
| 2004/0016870 A1 * | 1/2004 | Pawlicki | G06K 9/4604 250/208.1 |
| 2005/0074143 A1 * | 4/2005 | Kawai | B60D 1/36 382/104 |
| 2006/0038381 A1 * | 2/2006 | Gehring et al. | 280/477 |
| 2007/0118261 A1 * | 5/2007 | Aguilar et al. | 701/37 |
| 2007/0208482 A1 * | 9/2007 | Thiede et al. | 701/70 |
| 2008/0033647 A1 * | 2/2008 | Milark et al. | 701/300 |
| 2008/0091309 A1 * | 4/2008 | Walker | 701/1 |
| 2008/0091320 A1 * | 4/2008 | Sakai | 701/42 |
| 2009/0236825 A1 * | 9/2009 | Okuda et al. | 280/477 |

(Continued)

FOREIGN PATENT DOCUMENTS

DE  10 2010 004 920  7/2011

OTHER PUBLICATIONS

European Search Report dated Jul. 11, 2013, Application No. 13174933.5-1755 (6 pages).

(Continued)

*Primary Examiner* — Rami Khatib
*Assistant Examiner* — Nicholas K Wiltey
(74) *Attorney, Agent, or Firm* — Howard & Howard Attorneys PLLC

(57) ABSTRACT

A vehicle trailer connect system and automated parking system for use with a motor vehicle. Apparatus of the system has an input for obtaining information from a vehicle communication bus; an output for sending information to a vehicle communications bus; a control circuit for controlling the position and movement of a motor vehicle; an image gathering system to obtain visual or spatial data between a motor vehicle hitch and a hitch receiver attached to the trailer. A system controller guides vehicle steering as the vehicle is backed through a field of view of the image gathering system.

51 Claims, 9 Drawing Sheets

(56) References Cited

U.S. PATENT DOCUMENTS

| | | |
|---|---|---|
| 2010/0096203 A1 | 4/2010 | Freese |
| 2010/0263142 A1* | 10/2010 | Jones et al. .................... 15/21.1 |
| 2010/0318241 A1* | 12/2010 | Post et al. ......................... 701/2 |
| 2011/0043633 A1* | 2/2011 | Sarioglu et al. .............. 348/148 |
| 2013/0002416 A1* | 1/2013 | Gazit ...................... B62D 1/28 |
| | | 340/438 |
| 2013/0226390 A1* | 8/2013 | Luo .......................... B60D 1/36 |
| | | 701/25 |
| 2014/0012465 A1 | 1/2014 | Shank et al. |

OTHER PUBLICATIONS

European Patent Office Communication pursuant to Article 94(3) EPC dated Jan. 26, 2017 for EP Application No. 13 174 933.5.

\* cited by examiner

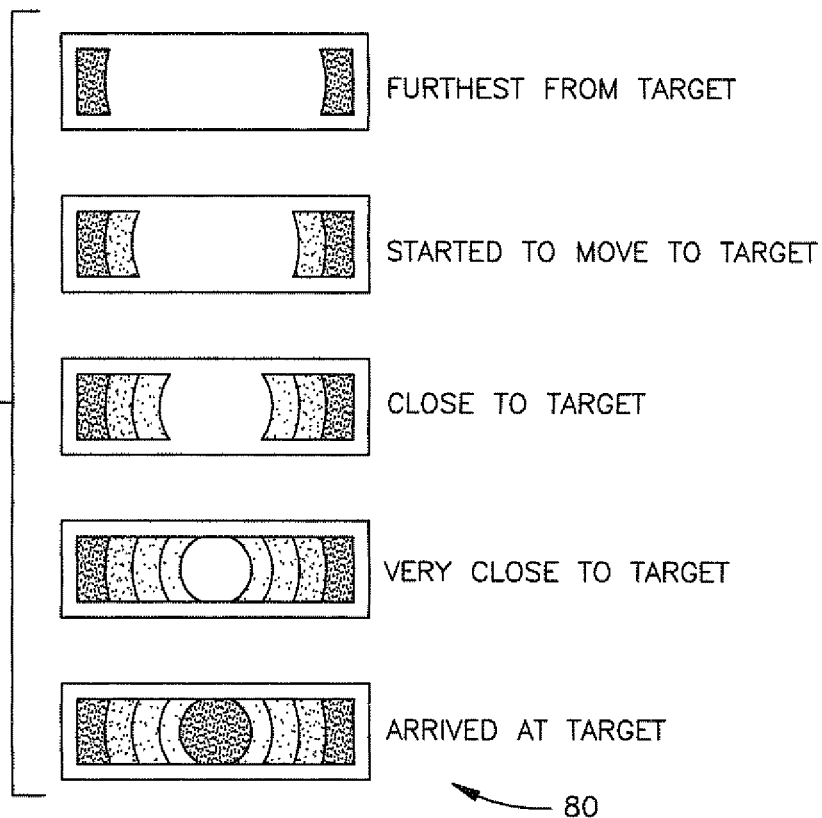
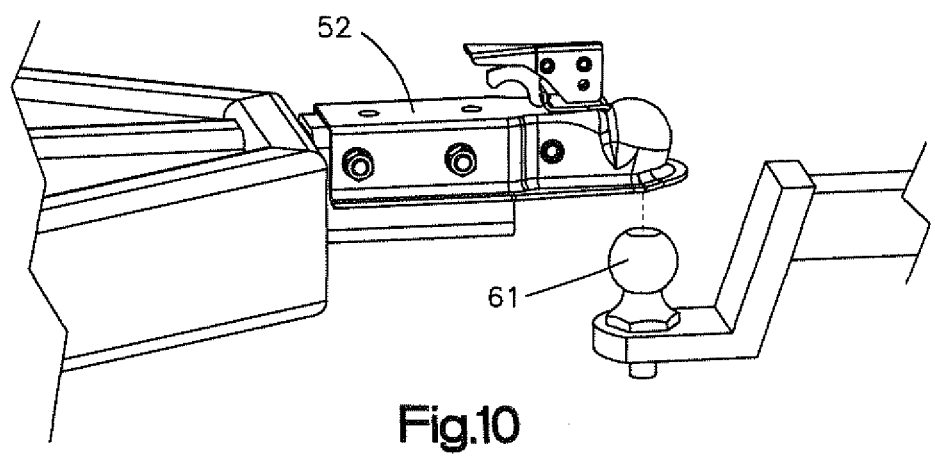

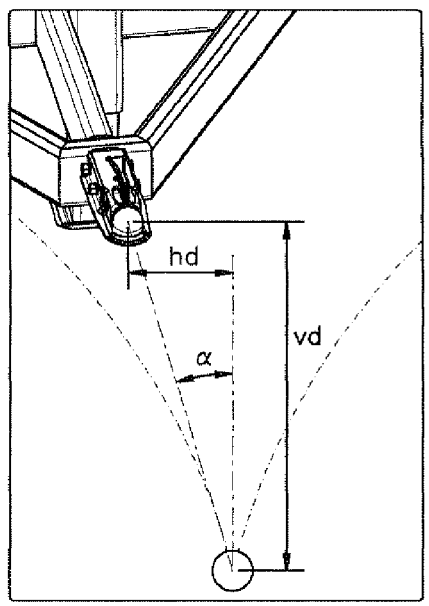
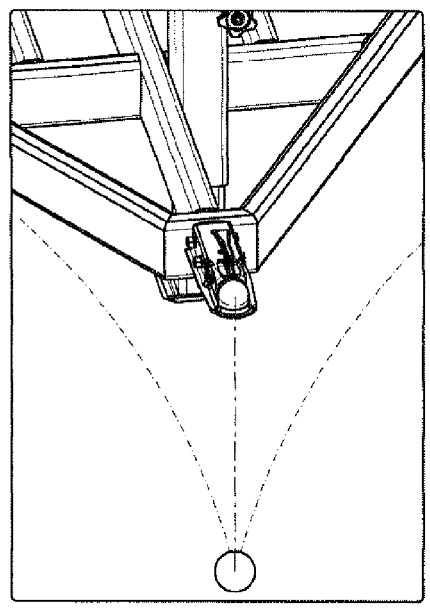
Fig.14　　　　　　　　　Fig.15
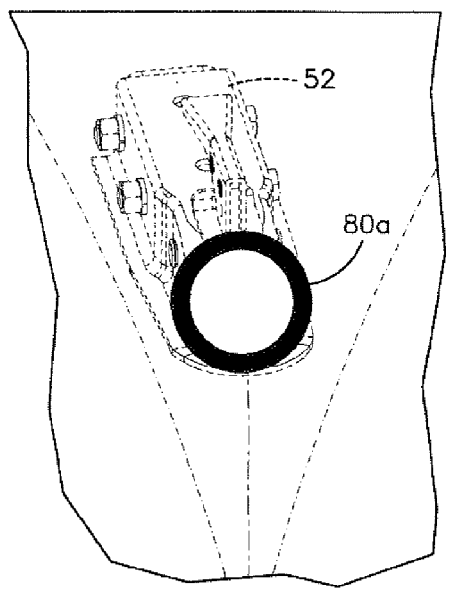
Fig.15A

US 9,914,333 B2

VEHICLE TRAILER CONNECT SYSTEM

CROSS REFERENCE TO RELATED APPLICATION

The present patent application claims priority from U.S. Provisional application entitled "Vehicle Trailer Connect System" filed Jul. 5, 2012 under Ser. No. 61/668,079 whose contents are incorporated herein by reference in the entirety for all purposes.

FIELD OF THE INVENTION

The present invention concerns a trailer hitching system for a vehicle that can either semi-automatically or fully automatically control a vehicle to align itself to a trailer hitch.

BACKGROUND ART

Many present day motor vehicles include rear facing cameras to help a motorist in safely backing the motor vehicle and are used in addition to side and center positioned rear view mirrors.

SUMMARY

The invention concerns apparatus and method for providing for the automatic alignment of a motor vehicle to a tow trailer.

An exemplary system has communications capability to send and receive data on a vehicle network for constructing an image of what is behind the vehicle. An electronic controller controls the communications, receiving and interpreting of image information, and determination of proper vehicle control to align the vehicle with a tow trailer.

One embodiment is coupled to a motor vehicle CAN communications bus and rearview camera system. The CAN bus provides information about the vehicle such as wheel angle, speed, and wheelbase dimension. The rearview camera system provides a detailed image about what is behind the vehicle. In an exemplary embodiment the system can accomplish alignment of a vehicle to a tow trailer quickly and accurately with limited involvement of the vehicle operator.

These and other objects advantages and features will become better understood from the following detailed description of one exemplary embodiment of the present invention which is described in conjunction with the accompanying drawings.

BRIEF DESCRIPTION OF THE DRAWINGS

FIG. 9 is a representative display sequence;

FIG. 10 is a perspective view in a region of a trailer hitch showing alignment between a ball of the hitch and a receiver attached to the trailer;

FIGS. 14 and 15 are simulated images of a type that appear on a dash mounted monitor during capture of such images by a camera C mounted to the rear of a vehicle V; and FIG. 15A is an enlarged simulated image of a trailer receiver with a confirming symbol overlying image data from the trailer receiver.

EXEMPLARY EMBODIMENT FOR PRACTICING THE INVENTION

Figure 1:
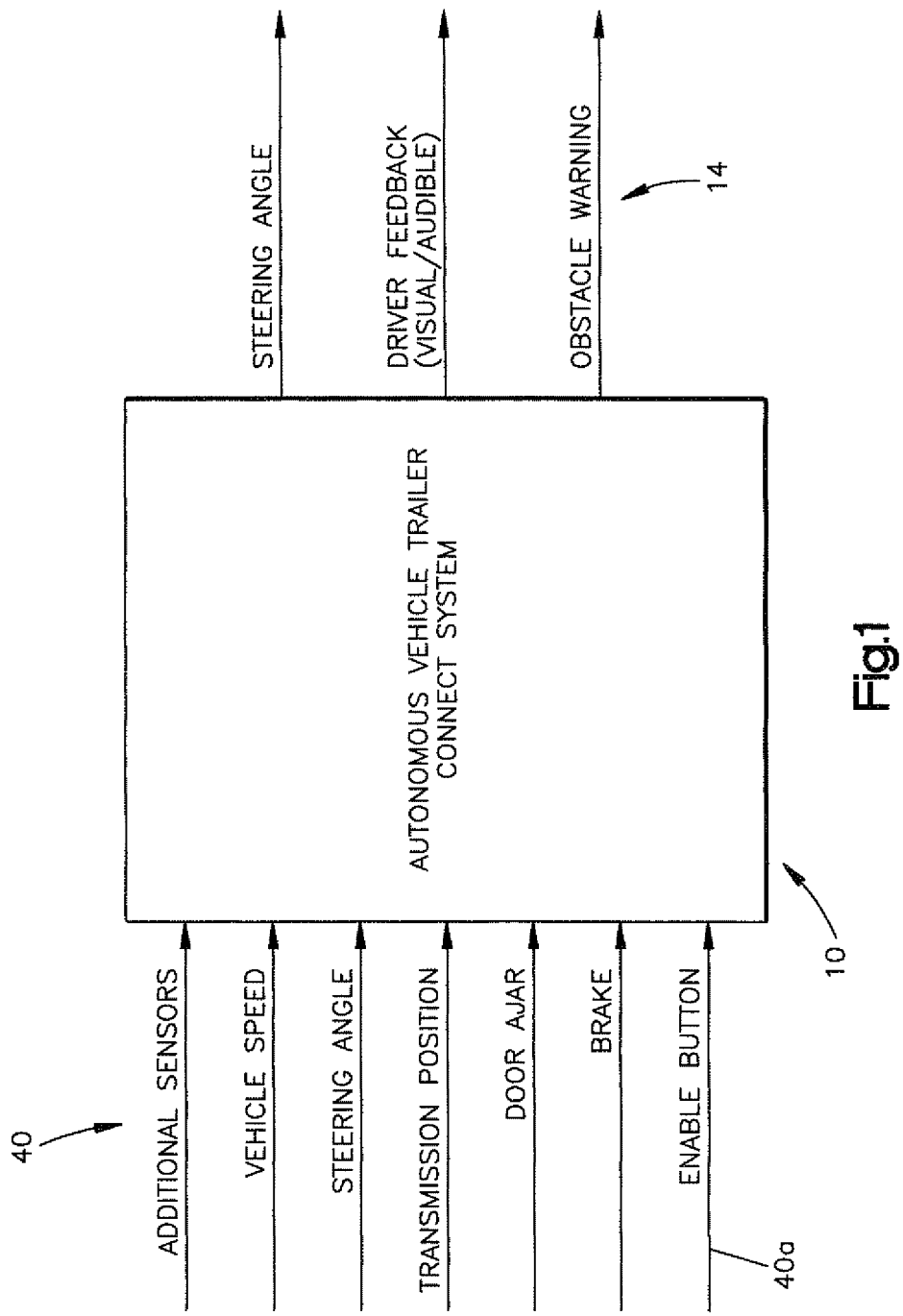
FIG. 1 is a basic block diagram schematic of a representative system for automated trailer/vehicle alignment.

The drawings depict an autonomous or automatic vehicle trailer connect system for use with a vehicle. Referring to FIG. 1, one disclosed exemplary embodiment of the invention is shown to include a control system 10 that monitors a number of signal inputs 40 and creates control outputs 14. The control system 10 is shown in greater detail in FIG. 2 and includes a control circuit 20 that includes a microcontroller 21, an input conditioning circuit 22, a communications circuit physical layer 23, an operator feedback driver circuit 24, visual driver feedback module 24a, and an obstacle warning driver circuit 25 with associated audible driver feedback module 25a. The control system 10 also includes image gathering apparatus 30. Various vehicle parameters 40 are obtained through vehicle communications with sensors 40 although they could be directly coupled to the control. The vehicle parameters are used in conjunction with the image gathering apparatus. A presently preferred microcontroller (21) is ADBF542WBBCZ commercially available from Analog Devices, Inc.

The image gathering apparatus 30 interfaces with the control module 20. The interface may be a direct connection from apparatus 30 or it may interface through vehicle bus communication such as the standard automotive CAN protocols. These protocols are published under documents from the Society of Automotive Engineering (SAE) under J1850, J1699-1, J1939 and others. Other published documents defining communications protocols are available from the International Organization for Standardization (ISO) as ISO 11898 and are incorporated by reference in their entirety for all purposes. The exemplary image gathering apparatus 30 is a standard image gathering camera that is already found on many vehicles. One suitable camera is commercially available from Chrysler LLC having part number 56054059AC.

The camera provides an image to the control circuit 20 for interpretation. The produced image may be black and white or color, and may be of various resolutions to provide adequate information for determining target parameters. The image produced may be from a single camera or from two or more cameras. A single camera provides sufficient information to determine a target object location of a fixed or known height. Two or more cameras allow for determining a target object location and its height relative to the vehicle. It is understood that the image gathering apparatus 30 does not have to be a conventional digital camera. The image produced and communicated to the control circuit 20 could come from various two dimensional or three dimensional image gathering devices such as LIDAR (Light Detection and Ranging), RADAR, infrared imaging, ultrasonics, and the like.

Figure 3:
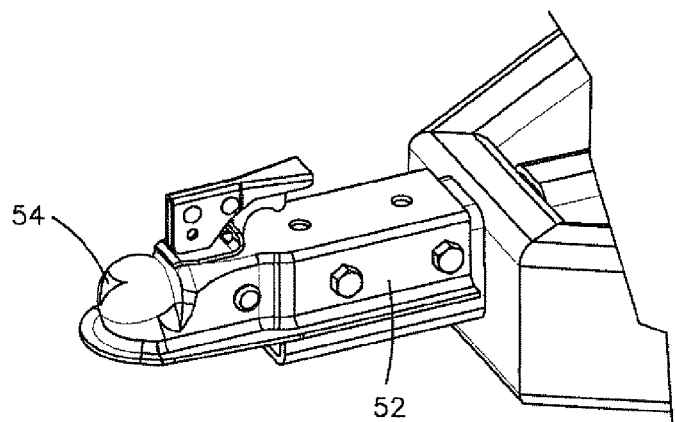
FIG. 3 is a trailer hitch receiver having a target symbol for use with the system.
Figure 4:
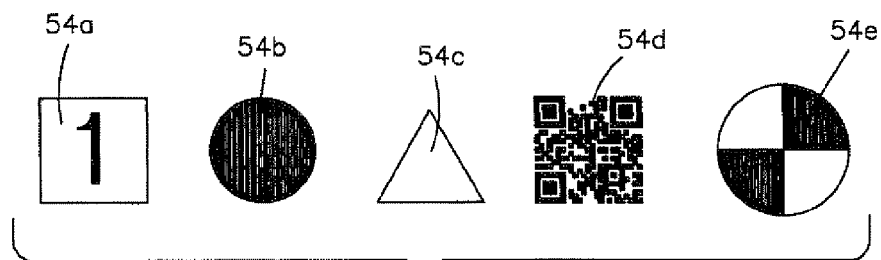
FIG. 4 shows an assortment of possible target symbols.
Figure 5:
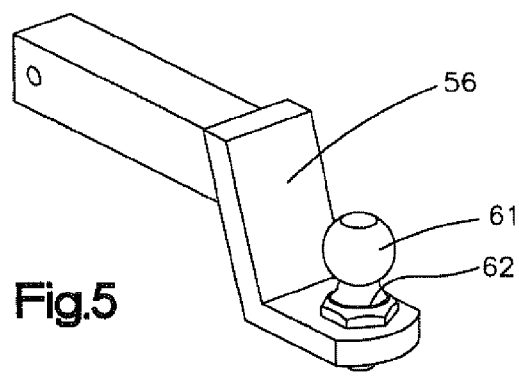
FIG. 5 is a perspective view of a motor vehicle hitch including an upwardly extending ball for attaching a trailer to the hitch.

Referring to FIGS. 3-5 the exemplary embodiment uses a target 54 placed on a trailer hitch receiver 52 such that the image sensor 30 has a clear view of the target. The target may be a shape, a pattern, a color or any combination of the above. System targets, samplings 54a, 54b, 54c, 54d, 54e of which are shown in FIG. 4, may be of any color that can be easily recognized such as blue, red, or yellow. The colored shape may be of one color or bordered by a color such as a yellow triangle with a black border. The shape itself may be round, square, triangular, or it may be a quick response code (QR) or other information containing symbol.

The system 10 is programmed to look for and recognize a predefined target that is located at a specific location on the trailer hitch receiver portion 52. A hitch ball 61 (FIG. 5) that is on the vehicle is at a known location so that there would be no recognition requirements for it. In the event that a system is implemented where the ball position is not known, a visual interrogation of the area behind the vehicle could also determine the ball location similar to the targeting system described for identifying where the trailer hitch receiver portion is located. The ball could be colored, or a colored collar 62 could be placed at the base of the ball as shown in FIG. 5. The collar could be of a predefined color or shape such that the system will recognize it and determine its location. An exemplary system would recognize the spherical shape of the ball and determine where it is located without the need for a colored or shaped target.

Figure 6:
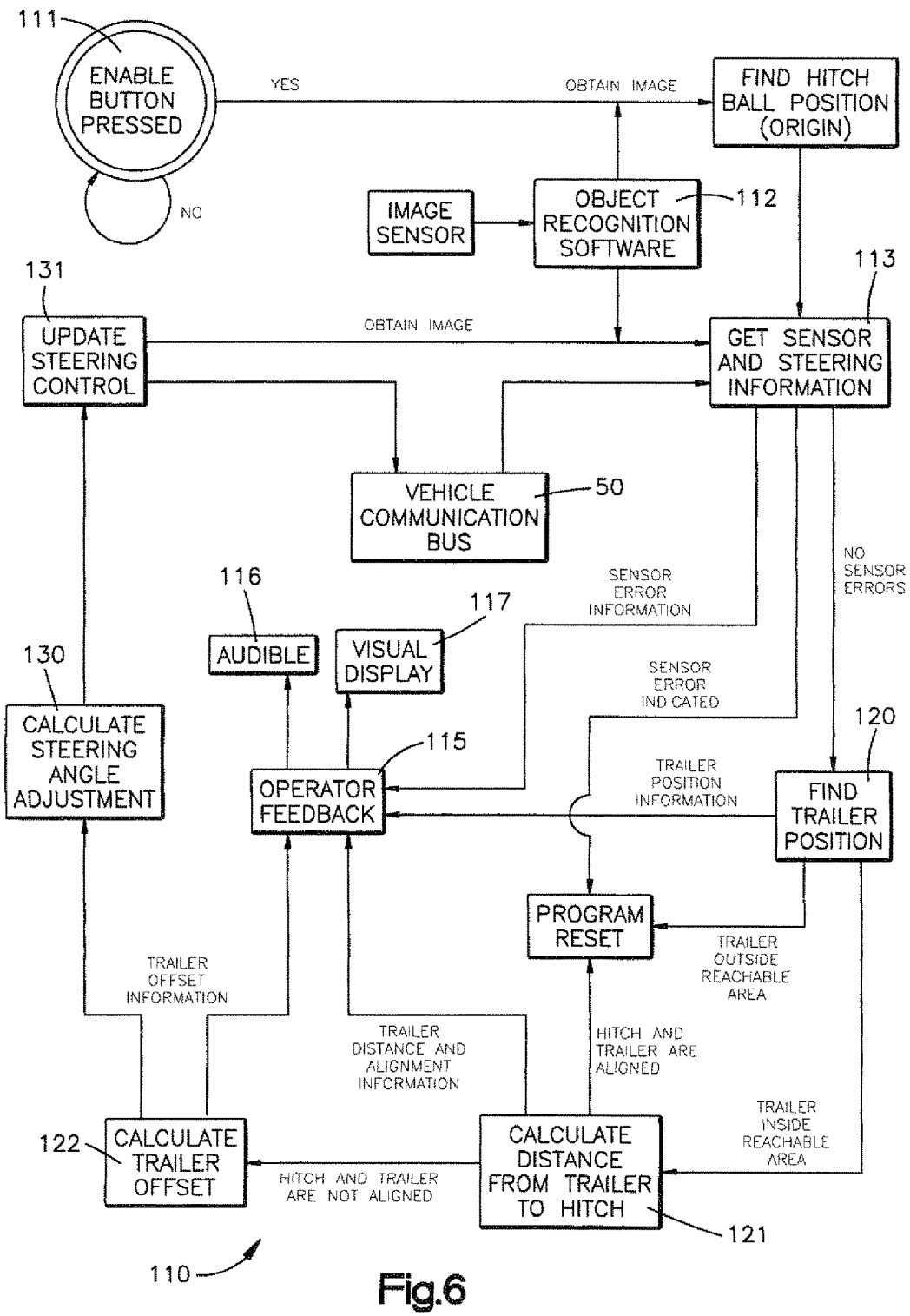
FIG. 6 is a basic flow diagram depicting the logic flow of the system.

When the locations of both the vehicle ball and the trailer hitch receiver portion have been determined, the control circuit 20 processes the images and determines distance between the two objects. Based on the distance between them and the turning characteristics of the particular vehicle, a route is determined that will align the vehicle ball and the trailer hitch. A flow diagram 110 shown in FIG. 6 details this process.

The route to take is achieved by turning the steering wheel of the vehicle to the correct angle so that when the distance between the vehicle ball and the trailer hitch closes to zero the ball and the hitch will be aligned such that the trailer hitch may simply be lowered onto the ball of the vehicle as shown in FIG. 10. The lowering of the trailer hitch onto the ball may be done by the motorist or automatically. An automatic system could entail a vehicle that lowers the rear suspension (kneels) so that the ball 61 can be moved under the trailer hitch. This is implemented by the controller communicating with a suspension control by means of the vehicle bus 50. Reference U.S. Pat. Nos. 6,470,248 and 6,428,363 which are incorporated herein by reference in their entirety for all purposed. When alignment is achieved the vehicle raises to normal suspension height, thereby engaging the hitch. It should be noted that the calculations to achieve proper alignment are being performed continuously to ensure that a proper route is maintained throughout movement of the vehicle.

Referring to flow diagram 110, the system is enabled by the vehicle operator pressing or touching a designated switch or location 111. The control module 20 will then obtain an image from image sensor 30 and process the image information using object recognition software routines 112 that determine if specific predetermined shapes and/or colors are present in the field of view of image sensor 30. An alternate exemplary system can "learn" the presence of a particular marker (different from those in FIG. 4) in the field.

Such a system would identify discrete items within the camera field of view and then allow a user to certify the correct marking. Confirmation of the correct hitch and/or marking thereof can be accomplished by the user engaging with a visual display 117. The visual display 117 will show the identified items in the field of view and will accept a particular item based on operator feedback 115. The feedback can be by discrete physical switch, or in the case of a touch screen, a video button shown on the display or by touching the video image of the selected object on the screen. It is understood that the anticipated target does not need to be predetermined by the system and that the user may simply select the desired target. Once the user has selected the desired target, the system will begin the calculations for moving the vehicle to the selected hitch.

The control 20 will then use a predetermined location for the vehicle hitch ball or it will use information gathered from image sensor 30 and processed by object recognition software 112 to determine the location of the hitch ball. Moving on to software block 113, control 20 obtains vehicle sensor information from vehicle bus 50. The vehicle communication bus 50 could be CAN protocol based as shown in CAN Bus 50 in FIG. 2 or it could be any other vehicular bus type such as LIN, FlexRay, J1939, or the like, as required. Software routines of block 113 will determine if pertinent vehicle sensors such as doors closed, reverse gear, vehicle and engine speed, hatch closed, or obstacle detection are in acceptable states. If there are unacceptable sensor states, or hitch or ball locations cannot be determined, the control 20 will terminate the automatic alignment process and will send a status indicating signal to operator feedback routine 115. Software routine 115 will provide the required information to audible routine 116 and visual display routine 117. Audible routine 116 is coupled with the circuit 25a and Visual display routine 117 is coupled to the circuit 24a, both of FIG. 2.

Figure 7:
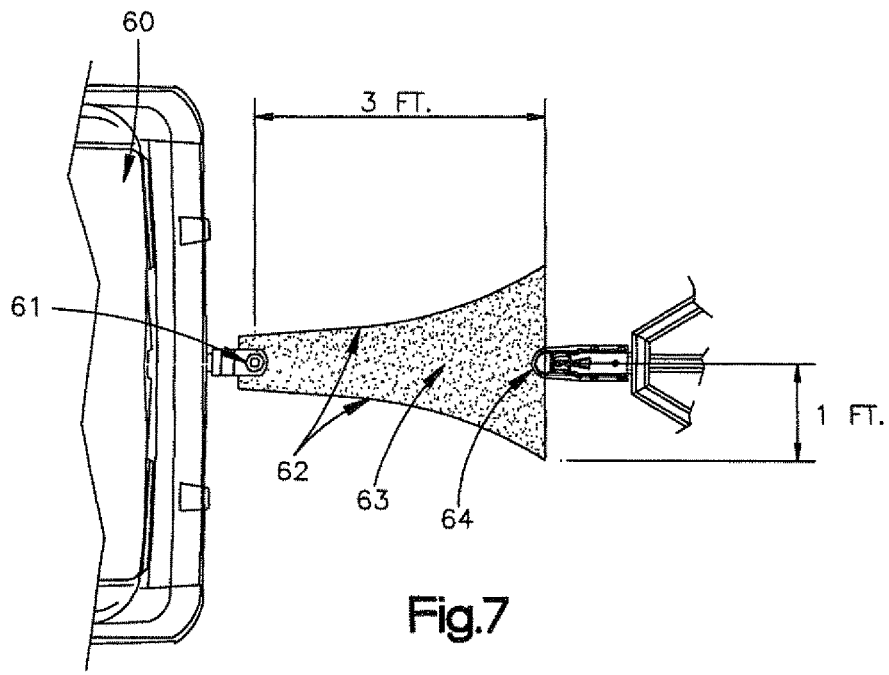
FIG. 7 shows the vehicle to trailer hitch relationship and an area between the vehicle and trailer hitch.
Figure 13:
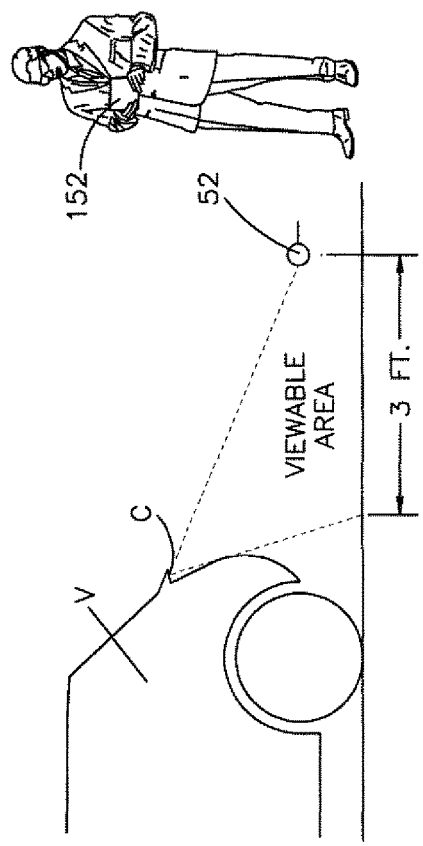
FIG. 13 is a schematic elevation view of a trailer hitch region of a vehicle.

If sensor states and target locations are acceptable, software flow moves to a find trailer position routine 120 that verifies the trailer hitch receiver location is inside an area 63 defined by the boundary 62 of FIG. 7. If the hitch receiver is outside of the area that can be reached by the vehicle hitch ball the automatic alignment process will terminate and the vehicle operator will be notified. If the trailer hitch receiver is inside the reachable area, the routine 121 calculates the distance and angle from the trailer hitch receiver to the vehicle hitch ball. The vertical distance from the hitch receiver to the ball is determined using pixel count on the image sensor 30 such that $vd = (y \text{ pixel count }_{hitch\ receiver} - y \text{ pixel count }_{hitch\ ball})$ Likewise the horizontal distance, or offset, of the hitch receiver from the centerline of the vehicle is determined by routine 122 using pixel count on image sensor 30 such that $hd = (x \text{ pixel count }_{hitch\ receive} - x \text{ pixel count }_{centerline})$. Representative depictions for two trailer positions in relation to a vehicle are shown in FIGS. 14 and 15. These two displays are 640 by 480 pixel outputs captured at thirty frames per second from the Camera C (FIG. 13). In FIG. 14 the pixel representations of vd and hd are labeled. Since the centerline of the vehicle is considered zero, the horizontal distance hd is simply the pixel count away from centerline. The angle of the trailer hitch receiver from the vehicle centerline is therefore $\alpha = \arctan(hd/vd)$ as can be seen in FIG. 14. Trailer hitch receiver alignment information is sent to operator feedback routine 115 for processing. As the vehicle steering wheel is controlled and the vehicle backed toward the trailer from a starting position (FIG. 14 for example) the trailer receiver becomes more closely aligned with the hitch. As seen in FIG. 15 for example, the offset (hd) has been reduced. In one embodiment, the controller superimposes a visual feedback symbol 80a (FIG. 15A) in the form of a colored circle over the trailer receiver to give an assurance to the motorist that the system 10 is tracking the position of the receiver relative to the hitch.

An optimum instantaneous steering angle (sa) for achieving alignment as defined by the steering wheel is calculated by software routine 130 using sa=(k*(α/hd)) where k is a constant that will provide the relationship between the steering wheel angle of rotation and the vehicle tire/wheel angle. It is understood that the equation may change based on proximity to the target allowing for finer control of steering angle. The steering angle in one application on a Fiat 500 is limited to ±540 degrees of rotation. It is understood that there is a direct relationship between steering wheel angle and vehicle tire/wheel angle. Calculations to derive the required turn angle may be done by the steering wheel angle or by the vehicle tire/wheel angle. An alternate embodiment will allow for the vehicle tire/wheel angle to change without affecting the steering wheel angle.

The calculated desired steering angle is sent to software routine 131 to update the steering control. Routine 131 sends pertinent information to the vehicle through vehicle communication bus 50. The vehicle power steering control then processes the requested steering wheel angle and rotates the steering wheel to the requested orientation.

Figure 2:
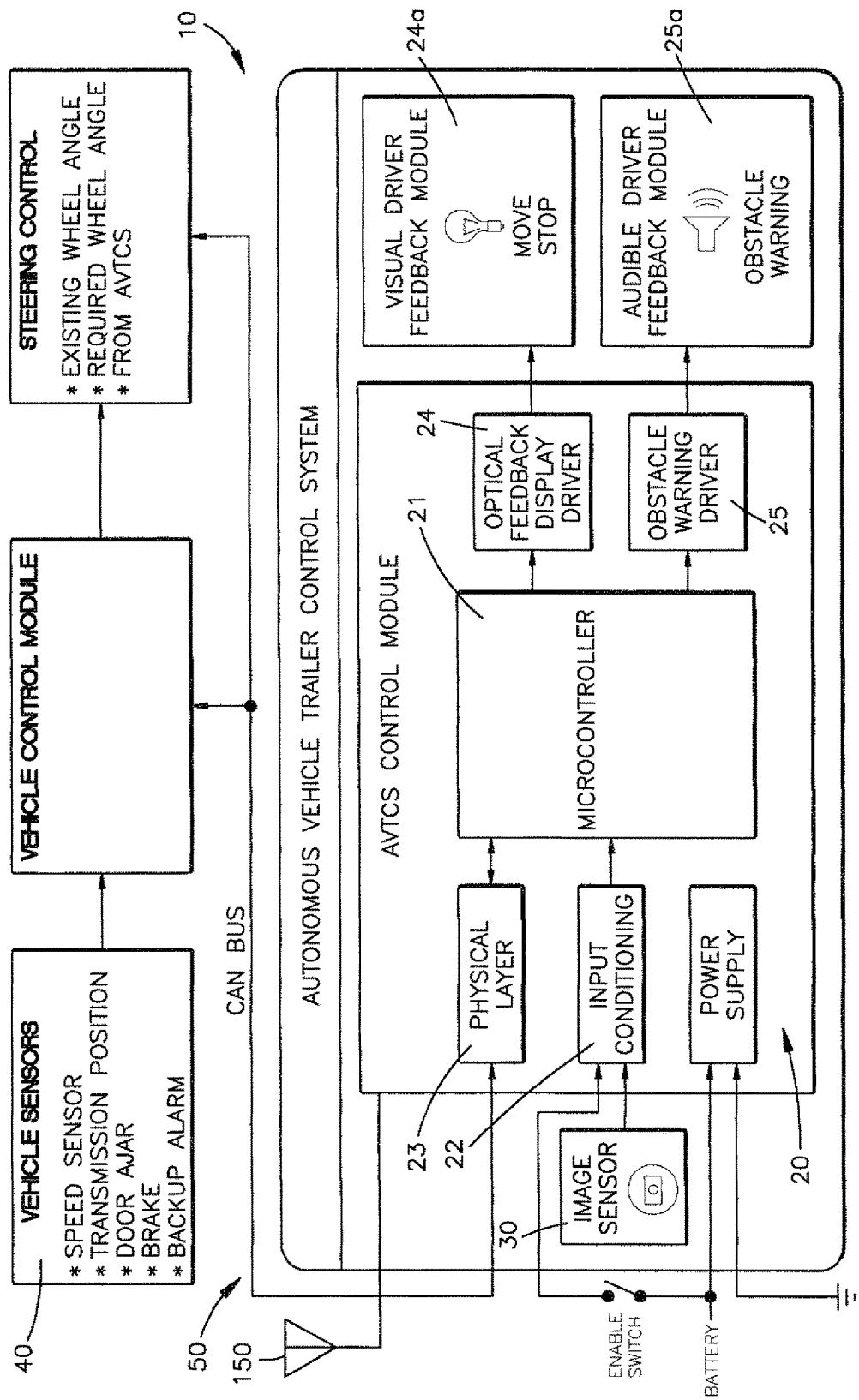
FIG. 2 is a more detailed diagram schematic of the FIG. 1 representative system.

In accordance with the exemplary control system and reference to FIG. 2, an electrical connection coupled to a vehicular communication bus 50 provides available data from the vehicle to the control system 10 for proper operation and diagnostics. The system interrogates the vehicle for signals 40 such as door open, incorrect gear, speed too fast, hatch open, steering wheel torque exceeds a threshold, or obstacle detection. Any signal or condition that is predefined as a safety issue can be programmed to terminate the auto-hitch control system 10 and alert the vehicle operator that there is an issue that needs correction. Likewise the control system 10 can notify the vehicle operator that the existing relationship between the vehicle and the trailer is such that they cannot be aligned. An example would be that the vehicle cannot turn at a sharp enough angle to achieve alignment. In a case such as this the operator will need to realign the starting relationship between the vehicle and the trailer and the system 10 informs the motorist to make this adjustment in relative positioning.

If the motorist grabs the steering wheel during either automatic or semi-automatic alignment, the automatic alignment process stops. The torque signals from a torque sensor are conveyed to the control system 10 by means of the bus 50 and automatic steering is suspended until the user reactivates the system by pressing the button 40a.

The exemplary control circuit interfaces with a vehicle mounted switch 40a for enabling and initiating the auto-hitch system. The switch would be mounted on the vehicle dash at a location convenient for the operator. The vehicle should be pre positioned by the operator such that there is a coarse relationship between the vehicle and the trailer hitch.

Figure 8:
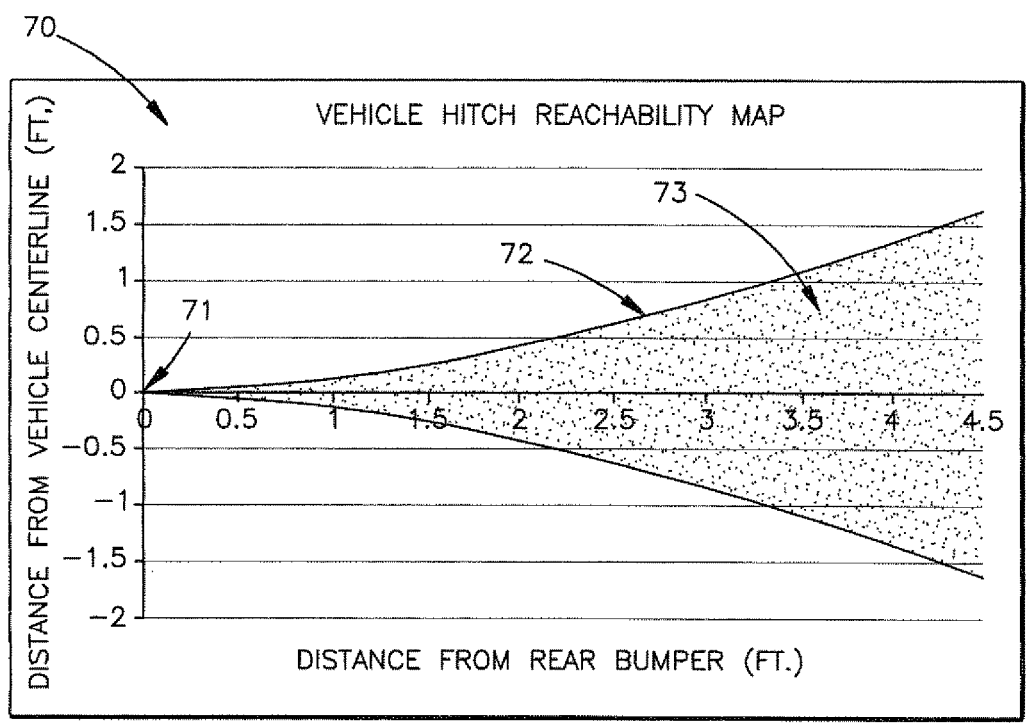
FIG. 8 shows a graphical representation of a reachable area.

Referring now to FIG. 7, a typical requirement would be that the vehicle needs to be within 3-4 feet of the trailer hitch receiver and must be within +15 degrees from centerline with the vertex being the hitch ball 61. In FIG. 7 one can see vehicle 60 and the hitch ball 61 mounted to the vehicle. A region having bounds or boundary 62 defines an area that is reachable by the ball of the vehicle. The area 63 encompassed by the bounds 62 represents all locations that the hitch ball can be guided to based on a turn radius of the vehicle. If the hitch receiver 52 is inside the bounded area 63, the position of vehicle hitch ball 61 can successfully be controlled and placed under hitch receiver 52. Referring to FIG. 8 a graph 70 shows the vehicle hitch ball 61 represented on the graph at the 0,0 coordinate location 71. A shaded area boundary 72 corresponds to the boundary 62 of FIG. 7 and the area 73 corresponds to the area 63 of FIG. 7. The curved portion of boundary 62 and 72 are defined by a simple quadratic fit of the form $y=cx^2+bx+a$. In one exemplary system the coefficients are a=0.001346, b=0.114713, and c=0.056696. This quadratic fit represents the boundary 62 of FIGS. 7 and 72 of FIG. 8 of a reachability map for a Fiat 500. Coefficients are different for other vehicle turn radii and wheelbase lengths and hence the reachable area will also be different.

To engage the system, the brake must be pressed and the vehicle must have the reverse gear placed in position. Then, if all of the safety preconditions are met such as doors closed, speed is zero, and the like, the operator may then activate a switch by pressing it or touching it in the case where a capacitive sensing switch is employed. The system will then commence to align the vehicle to the trailer hitch.

The control system may be such that the operator is expected to control both the brake and the accelerator. The operator will know the approximate relationship between the ball and the trailer hitch by a visual display and/or acoustic signal. Referring to FIG. 9 a visual system could be a series of indicators or lights 80 either increasing from one lighted region to two lighted regions, and so on; or vice versa. It is understood that the visual display can take many forms both physically and graphically. Likewise an audible system could be implemented such that a tone type system is used to notify the operator when to slow down and when to stop by using the brake. Tone indicators could include frequency of tone occurrences (beeps per second), tone count changes based on distance (1 beep at 2 feet away, 2 beeps at 1 foot away, and so on), pitch variations, or combinations thereof. The exemplary system uses both visual and audible cues to notify the vehicle operator when to move and when to brake the vehicle. It is understood that the vehicle could incorporate an object detection/avoidance system. Systems like these are on many vehicles today and provide an audible and/or visual indication of obstacles proximal to the vehicle. They warn the operator if someone or something is behind the vehicle so that they can take action taken so as not to collide. The exemplary vehicle trailer connect system would employ such an obstruction detection system and would disable auto-hitching function if one or more backup alarm sensors detects an obstruction. One such sensor is a capacitive sensor that is mounted to a vehicle panel such as a bumper that allows for the sensing of an object proximal to the panel. Reference US patent published application 2011/0313619 which is incorporated herein by reference in its entirety for all purposed. Visual and/or audible alerts could also be employed similar to what is already used in the automotive/truck industry today.

Figure 11:
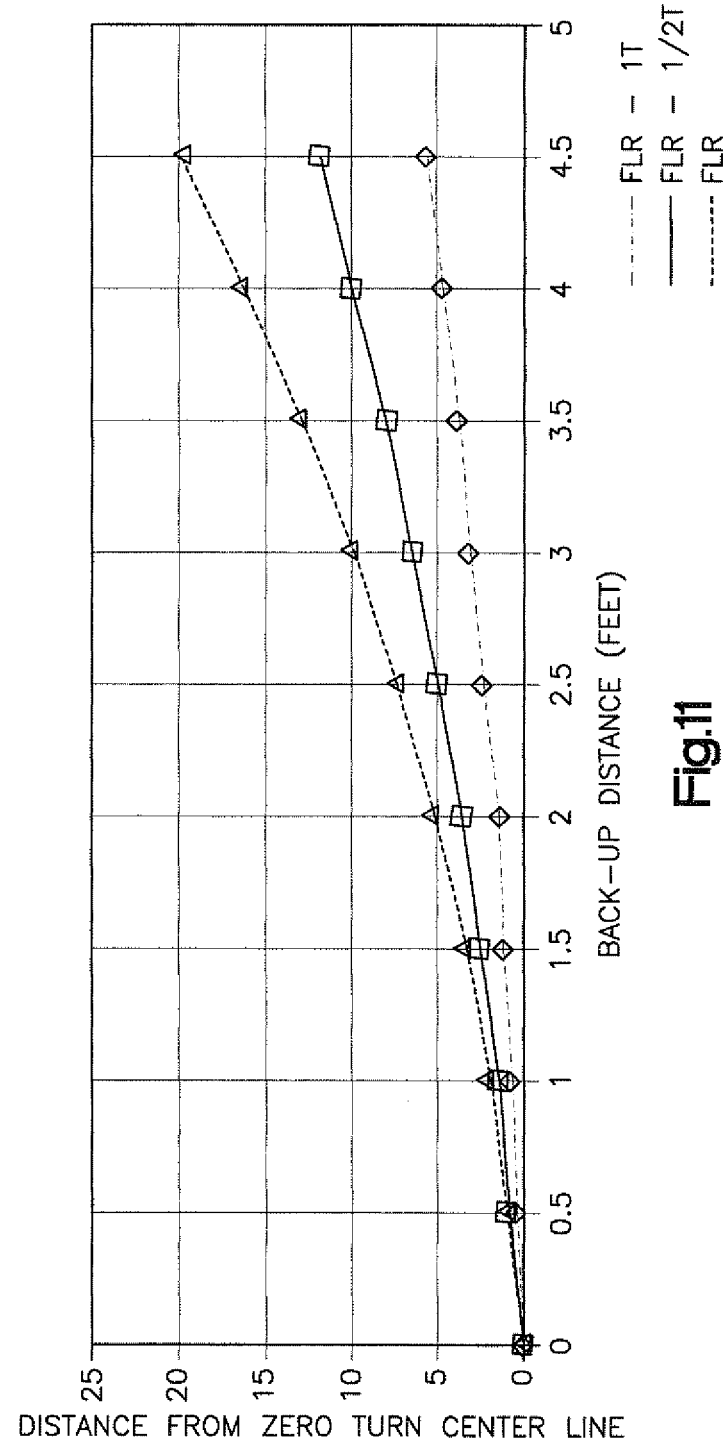
FIG. 11 is a graph depicting alternate paths of a ball of a trailer hitch based on steering wheel settings of the vehicle.
Figure 12:
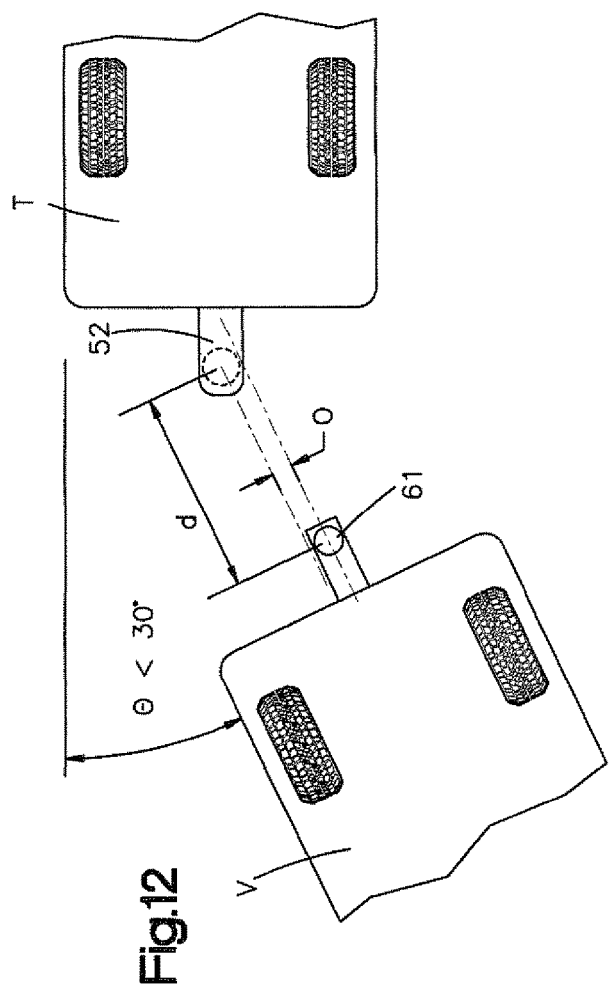
FIG. 12 is a schematic plan view of a trailer and motor vehicle.

There are many possible vehicle back up paths for reaching a particular correct relation between the ball and the region of the marker 54 on the receiver into which the ball fits during use. The preferred software implementation starts by adjusting an initial steering wheel angle and maintaining that choice until visual feedback signals from the camera confirm that a course correction is needed based on the relative position of the ball and the receiver after an initial amount of relative movement. FIG. 11 illustrates the paths of travel (based on the quadratic equations above the graph) for three different steering wheel settings. This data is tabulated (in feet) in tables 1 and 2 below. As noted above, this data is specific to a particular motor vehicle. In the table labeled raw data, an initial offset O (0.25 feet or 3 inches) (FIG. 12) exists between the ball and the receiver, i.e., the receiver is not aligned with the center line of the vehicle and would not be properly positioned should the motorist merely back up the vehicle. In the FIG. 11 graph the term "FLR" refers to the "full lock right" orientation of the steering wheel.

TABLE 1

Raw Data

| Backup Distance (Ft) | FLR-1T | FLR-1/2T | FLR |
|---|---|---|---|
| 0 | 0.250 | 0.250 | 0.250 |
| 0.5 | 0.750 | 1.125 | 1.125 |
| 1.0 | 1.125 | 1.875 | 2.375 |
| 1.5 | 1.438 | 2.813 | 3.875 |
| 2.0 | 2.063 | 3.938 | 5.750 |
| 2.5 | 2.750 | 5.250 | 7.938 |
| 3.0 | 3.250 | 6.563 | 10.500 |
| 3.5 | 4.125 | 8.313 | 13.375 |
| 4.0 | 5.125 | 10.313 | 16.688 |
| 4.5 | 6.188 | 12.250 | 20.250 |

TABLE 2

Normalized

| Backup Distance (Ft) | FLR-1T | FLR-1/2T | FLR |
|---|---|---|---|
| 0 | 0 | 0 | 0 |
| 0.5 | 0.500 | 0.875 | 0.875 |
| 1.0 | 0.875 | 1.625 | 2.125 |
| 1.5 | 1.188 | 2.563 | 3.625 |
| 2.0 | 1.813 | 3.688 | 5.500 |
| 2.5 | 2.500 | 5.000 | 7.688 |
| 3.0 | 3.000 | 6.313 | 10.250 |
| 3.5 | 3.875 | 8.063 | 13.125 |
| 4.0 | 4.875 | 10.063 | 16.438 |
| 4.5 | 5.938 | 12.000 | 20.000 |

It is noted that FIG. 11 depicts data for three paths but an initial steering wheel setting would typically be between these three paths. It is also noted that as movement progresses, path corrections occur due to continuous updating of the image obtained by the camera C (exemplary system every 100 milliseconds) so that the steering wheel position is constantly adjusted based on then current offset O and separation data d. Additionally, the present system relies on motorist operation of the accelerator and brake and only the steering is controlled by the system 10 in the continuous matter described.

Alternative Embodiments

An alternate system could be fully autonomous such that the vehicle operator engages the system and the vehicle trailer connect system 10 controls all aspects of the trailer connection operation including gear selection, steering, acceleration, and braking. The operator would have to take no action in the alignment process other than initiating the alignment by actuating a switch. It is understood that various combinations of vehicle control can be implemented from fully autonomous to only steering control. The aforementioned safety related sensors would still be employed to ensure the safest possible operation.

Another alternate embodiment would allow for the system to be engaged remotely by a vehicle key fob. If the vehicle is set in the proper starting position and safety and operational consideration are taken into account, the disclosed hitching sequence could be initiated by a button on the vehicle key fob. This would allow for the operator to watch the system from outside of the vehicle and be ready to lower the hitch onto the ball when alignment is complete.

A further alternate embodiment is also a remote execution of the auto-hitch sequence but by using a cell phone/smart phone with an application running on it that allows for vehicle control to take place. The communications to and from the vehicle could be such that the phone could display the image that the vehicle is using to perform the trailer alignment function. It could also give telematics information such as speed, steering angle, distance to target, and so forth. In such an embodiment, the system 10 includes an antenna 150 for performing communications or alternatively, the communication could occur using an already existing antenna with data transmitted to and from the controller 21 by means of the vehicle bus 50.

Another alternate embodiment allows for remote execution of the auto-hitch sequence by using a tablet 152 such as an iPad manufactured by Apple, Inc. of Cupertino, Calif. or a Galaxy Tab by Samsung Electronics Co., Ltd. of Suwon, South Korea with an application running on the tablet that allows for vehicle control and monitoring to take place. The communications to and from the vehicle controller is such that the device displays the image that the vehicle is using to perform the trailer alignment function. It also give telematics information such as speed, steering angle, distance to target, and so forth. It is contemplated that any appropriate interface device that implements direct communication such as Bluetooth, Wi-Fi, ZigBee, Z-Wave, or the like; or indirect communications such as through cell phone service could be used. Another alternate embodiment uses an RFID tag transponder that gives a vehicle mounted receiver a target to home in on. A receiver and antenna system interrogates the RFID tag signal and determines the direction and distance from the tag. The calculation allows the vehicle to back up and align with the tag. This system has advantages over visible light based imaging systems in that the system works in the dark and in dense fog. It also allows for a greater starting distance between the vehicle and the trailer.

Another alternate embodiment of the system reverses the steering direction when in trailer backup mode. One of the benefits of electric steering is that there is no direct mechanical linkage from the steering wheel to the vehicle wheels. This affords the capability to alter the relationship between the steering wheel and the vehicle wheels as desired for different applications. Hence in a trailer backup mode the electric steering can reverse its direction so when the steering wheel is turned left, the wheels will turn right and vice versa. In this way when backing up with a trailer there will not be the reverse steering issue that many drivers have problems with. In addition a vehicle data gathering device such as a camera can monitor the relationship between the vehicle and the trailer as the operator backs up. In the event that a jackknife condition is likely to occur, the control system will compensate to eliminate the condition. If avoidance is not possible the system will alert the operator to the potential hazard. The system could also automatically brake the vehicle so that damage to the trailer and vehicle is avoided.

A further alternate embodiment would employ voice commands to engage the system and select the desired hitch and/or target thereof.

Another embodiment would integrate the vehicle trailer connect system 10 with other vehicle functions so as to reduce the number of required electronic modules and components therein. One such function is park assist. This function is incorporated into system 10 so that the signal from an image gathering device such as a camera, and the image tracking and obstacle avoidance algorithms of the vehicle trailer connect system are used to aid in the parking function.

While the invention has been described with a degree of particularity, it is the intent that the invention include all modifications and alterations from the disclosed design falling within the spirit or scope of the appended claims.

The invention claimed is:

1. An apparatus for positioning a trailer hitch attached to a motor vehicle with respect to a trailer hitch receiver attached to a trailer comprising: one physical target for identifying a position of the trailer hitch receiver; one data gathering device spaced from the one target for obtaining picture element data from an observation region of a trailer hitch between the trailer hitch and a trailer hitch receiver positioned within the observation region of the trailer hitch; a controller configured to obtain predetermined vehicle sensor states from a plurality of predetermined vehicle sensors comprising doors closed, reverse gear, vehicle and engine speed, and hatch closed, to determine if the vehicle sensor states are acceptable, wherein the doors are closed, the vehicle is in the reverse gear, the vehicle and engine speeds are met, and the hatch is closed, to allow activation of an alignment process if the vehicle sensor states are acceptable; said controller being configured to define a boundary having an area therein reachable by the trailer hitch to the trailer hitch receiver that can be guided based on a turn radius of the motor vehicle, to terminate the alignment process if the vehicle sensor states are unacceptable, to verify that the one target is inside the area defined by the boundary, to terminate the alignment process if the one target is outside the area defined by the boundary, to determine a vertical distance from the one target to the trailer hitch using a pixel count from the picture element data from the observation region of the trailer hitch, to determine a horizontal distance from the one target to a centerline of the motor vehicle using the pixel count from the picture element data from the observation region of the trailer hitch, to determine a vehicle steer angle to reduce an offset between a reference line passing through the trailer hitch and the trailer hitch receiver while backing the vehicle, to determine a route that will align the trailer hitch and the trailer hitch receiver, to control the motor vehicle to align the trailer hitch and the trailer hitch receiver either semi-automatically or automatically, to stop alignment of the trailer hitch and trailer hitch receiver during the and to suspend alignment until a user reactivates the alignment; and an interface for communicating vehicle information to the controller including a user activated switch to produce an actuation signal for initiating and reactivating hitch/receiver alignment and conveying steering command signals to a vehicle steering system based on the determined vehicle steer angle.

2. The apparatus of claim 1 wherein the data gathering device is a camera for capturing an image of the region of the trailer hitch.

3. The apparatus of claim 2 wherein the interface includes a system bus that provides a video image to the controller.

4. The apparatus of claim 2 wherein the camera is a image digital video camera.

5. The apparatus of claim 1 wherein further comprising a display for indicating a distance between the trailer hitch and the trailer hitch receiver.

6. The apparatus of claim 1 wherein the controller updates a vehicle steer angle as the vehicle moves along a target path of travel.

7. The apparatus of claim 1 wherein the data gathering device is a LIDAR system.

8. The apparatus of claim 1 wherein the data gathering device is a RADAR system.

9. The apparatus of claim 1 wherein the data gathering device is an ultrasonic system.

10. The apparatus of claim 1 wherein data from the data gathering device is stored in a memory and transmitted by a communications bus to the controller.

11. The apparatus of claim 1 further comprising a sensor that is mounted to the motor vehicle for sensing of an object proximal to the motor vehicle and wherein the controller suspends movement of the motor vehicle in response to the sensing of the object proximal to the motor vehicle.

12. The apparatus of claim 11 wherein the sensor is a capacitive sensor.

13. The apparatus of claim 1 wherein said controller is programmed to i) monitor picture elements gathered from the observation region and ii) use said using picture elements determine a first path of travel for the vehicle to achieve a predetermined relation between the trailer hitch and a trailer receiver connected to a trailer and iii) use data from the picture elements to determine a second path of travel for the motor vehicle to maneuver the motor vehicle to a parking position in proximity to one or more additional motor vehicles within a field of view of the data gathering device; and wherein said interface for communicating vehicle information to the controller includes an actuation signal for initiating movement along one of the first and second paths.

14. The apparatus of claim 1 where said controller continues to monitor separation data from the image gathering device as the motor vehicle backs toward the trailer, determines an updated vehicle steer angle, and conveys command signals to the vehicle steering system based on the updated steer angle.

15. A method of aligning a trailer hitch attached to a motor vehicle with a trailer hitch receiver attached to a trailer comprising: placing one target on the trailer hitch receiver for identifying a position of the trailer hitch receiver; obtaining with one data gathering device an image of a region occupied by a trailer hitch and a trailer hitch receiver having the one target for identification of the trailer hitch; obtaining predetermined vehicle sensor states from a plurality of predetermined vehicle sensors comprising doors closed, reverse gear, vehicle and engine speed, and hatch closed, determining if the vehicle sensor states are acceptable, wherein the doors are closed, the vehicle is in the reverse gear, the vehicle and engine speeds are met, and the hatch is closed, and allowing activation of an alignment process if the vehicle sensor states are acceptable; defining a boundary having an area therein reachable by the trailer hitch to the trailer hitch receiver that can be guided based on a turn radius of the motor vehicle; terminating the alignment process if the vehicle sensor states are unacceptable; verifying that the one target is inside the area defined by the boundary; terminating the alignment process if the one target is outside the area defined by the boundary; analyzing the image of the region occupied by the trailer hitch and the trailer hitch receiver to determine a vertical distance from the one target to the trailer hitch using a pixel count of the image between the trailer hitch and the one target of the trailer hitch receiver and to determine a horizontal distance from the one target to a centerline of the motor vehicle using the pixel count of the image; based on the motor vehicle turning characteristics and the relative position of the trailer hitch with respect to the one target determining a route that will align the trailer hitch and the trailer hitch receiver and controlling a motor vehicle steer angle to reduce an offset between a reference line passing through the trailer hitch and the trailer hitch receiver when backing said motor vehicle either semi-automatically or automatically; communicating command signals to a motor vehicle steering system based on the motor vehicle steer angle for moving the motor vehicle toward the trailer to at least approximately achieve a predetermined relation between said trailer hitch and trailer hitch receiver; stopping alignment of the trailer hitch and trailer hitch receiver during the automatic or semi-automatic alignment if a user grabs a steering wheel of the motor vehicle, and suspending alignment until a user reactivates the alignment; and reactivating the alignment by the user with a user activated switch to produce an actuation signal for reactivating the alignment.

16. The method of claim 15 wherein a controller for determining the steer angle communicates with the motor vehicle by means of a communications bus and wherein the controller periodically updates the steer angle and communicates an updated steer angle as the motor vehicle moves.

17. The method of claim 16 wherein the communications bus is a CAN communications bus.

18. The method of claim 16 wherein the controller communicates with a vehicle electric power steering module.

19. The method of claim 16 wherein the controller uses one or more vehicle parameters obtained from communications with the vehicle, said parameters comprising: steering wheel speed, steering wheel position, steering wheel torque, wheel angle, power steering motor current draw, engine RPM, vehicle speed, vehicle wheelbase, and maximum wheel angle.

20. The method of claim 19 wherein the controller suspends vehicle/trailer alignment if the power steering motor current exceeds a threshold.

21. The method of claim 19 wherein the controller suspends vehicle/trailer alignment if the steering wheel torque exceeds a threshold.

22. The method of claim 19 wherein the controller suspends vehicle/trailer alignment if the vehicle speed exceeds a threshold.

23. The method of claim 19 wherein the controller suspends vehicle/trailer alignment if the engine RPM exceeds a threshold.

24. The method of claim 16 wherein the controller communicates with a touch sensitive display.

25. The method of claim 16 wherein the controller lowers a rear suspension of the motor vehicle to allow for the hitch ball to be centered under the trailer hitch and raises a motor vehicle suspension to engage the ball to the hitch receiver.

26. The method of claim 16 wherein the controller communicates with a remote device outside the vehicle to initiate the obtaining of image data and analyzing said image data.

27. The method of claim 26 wherein the remote device is a cell phone.

28. The method of claim 26 wherein the remote device is a touch sensitive tablet.

29. The method of claim 26 wherein the remote device is an RFID tag.

30. The method of claim 26 wherein the remote device is a key fob.

31. A method of backing a motor vehicle with a trailer comprising: placing one physical target on a trailer hitch receiver of the trailer for identifying a position of the trailer hitch receiver; obtaining with one data gathering device data of a region occupied by a trailer attached to a vehicle to determine the relationship of the trailer to the vehicle; obtaining predetermined vehicle sensor states from a plurality of predetermined vehicle sensors comprising doors closed, reverse gear, vehicle and engine speed, and hatch defining a boundary having an area therein reachable by the trailer hitch to the trailer hitch receiver that can be guided based on a turn radius of the motor vehicle; terminating the alignment process if the vehicle sensor states are unacceptable, wherein the doors are open, the vehicle is not in the reverse gear, the vehicle and engine speeds are not met, and the hatch is opened; verifying that the one target is inside the area defined by the boundary; terminating the alignment process if the one target is outside the area defined by the boundary; analyzing using a pixel count of the data of the region; reversing the normal steering wheel to vehicle wheel turning relationship so that rotation of the steering wheel in one sense causes the vehicle wheels to rotate in an opposite sense when backing the trailer; monitoring a relationship between the trailer and the vehicle control while backing the vehicle and the attached trailer; stopping alignment of the trailer hitch and trailer hitch receiver during automatic or semi-automatic alignment if a user grabs a steering wheel of the motor vehicle, and suspending the alignment until a user reactivates the alignment; and reactivating the alignment by the user with a user activated switch to produce an actuation signal for reactivating the alignment; and indicating to a motorist with either an audible indication or a visual indication at least one of when to move, when to brake, when to slow down, and when to stop the motor vehicle during either the automatic or semi-automatic alignment.

32. The method of claim 31 additionally comprising determining an imminent undesired condition based on the monitoring; and communicating command signals to a vehicle steering system and/or brake system based on a relationship between the trailer and the vehicle to avoid the undesired condition.

33. The method of claim 31 additionally comprising determining a relationship between the trailer and the vehicle; and communicating command signals to a vehicle steering system based on the relationship between the trailer and the vehicle to at least approximately achieve a desired relationship as backing takes place.

34. An apparatus for positioning a trailer hitch attached to a motor vehicle with respect to a trailer hitch receiver attached to a trailer comprising: one target for identifying a position of the trailer hitch receiver; one image gathering device for obtaining picture elements from an observation region of a trailer hitch that includes the trailer hitch receiver; a controller configured to obtain predetermined vehicle sensor states from a plurality of predetermined vehicle sensors comprising doors closed, reverse gear, vehicle and engine speed, and hatch closed, to determine if the vehicle sensor states are acceptable, wherein the doors are closed, the vehicle is in the reverse gear, the vehicle and engine speeds are met, and the hatch is closed, to allow activation of an alignment process if the vehicle sensor states are acceptable; said controller being configured to define a boundary having an area therein reachable by the trailer hitch to the trailer hitch receiver that can be guided based on a turn radius of the motor vehicle, to terminate the alignment process if the vehicle sensor states are unacceptable, to verify that the one target is inside the area defined by the boundary, to terminate the alignment process if the one target is outside the area defined by the boundary, to determine a vertical distance from the one target to the trailer hitch using a pixel count from the picture elements obtained by the one image gathering device from the observation region and to determine a horizontal distance from the one target to a centerline of the motor vehicle using the pixel count from the picture elements, and based on the turning characteristics of the motor vehicle and the position of the trailer hitch receiver, to determine a route that will align the trailer hitch and the trailer hitch receiver and to control a motor vehicle steer angle to align the trailer hitch and the trailer hitch receiver while backing the motor vehicle either semi-automatically or automatically, and to stop alignment of the trailer hitch and trailer hitch receiver during the automatic or semi-automatic alignment if a user grabs a steering wheel of the motor vehicle, and to suspend alignment until a user reactivates the alignment; and an interface for communicating motor vehicle information to the controller including a user activated switch to produce an actuation signal for initiating and reactivating hitch/receiver alignment and periodically conveying steering command signals to a motor vehicle steering system based on a motor vehicle steer angle determined by said controller, said motor vehicle information additionally comprising safety information for determining an unsafe condition; wherein said controller suspends hitch/receiver alignment of the motor vehicle in response to sensing of an unsafe condition as indicated by the safety information and communicates signals via the interface for providing an audible indication or a visual indication to a motorist that hitch/receiver alignment has been suspended due to a determination by the controller of an unsafe condition.

35. The apparatus of claim 34 wherein the controller by communicates a signal for stopping motor vehicle movement in response to a determination of an unsafe condition.

36. The apparatus of claim 34 further comprising a sensor that is mounted to the vehicle for sensing of an object proximal to the motor vehicle and wherein the controller suspends movement of the motor vehicle in response to the sensing of the object proximal to the motor vehicle.

37. The apparatus of claim 34 wherein the controller determines if a hitch/receiver alignment is possible based on a current image from the region of the hitch and further wherein the controller suspends hitch/receiver alignment of the motor vehicle in response to determination that hitch/receiver alignment is no longer possible due to movement of the motor vehicle.

38. The apparatus of claim 37 wherein the controller additionally notifies a motorist with either an audible indication or a visual indication when hitch/receiver alignment is no longer possible due to movement of the motor vehicle.

39. The apparatus of claim 34 wherein one unsafe condition causing the controller to suspend hitch/receiver alignment is based on a sensed steering wheel angle.

40. The apparatus of claim 34 wherein one unsafe condition causing the controller to suspend hitch/receiver alignment is based on sensed motor vehicle speed.

41. The apparatus of claim 34 wherein one unsafe condition causing the controller to suspend hitch/receiver alignment is based on sensed steering wheel torque or power steering motor current.

42. The apparatus of claim 34 wherein one unsafe condition causing the controller to suspend hitch/receiver alignment is based on a door or hatch being open.

43. A method of aligning a trailer hitch attached to a motor vehicle with a trailer hitch receiver attached to a trailer comprising: placing physical one target on the trailer hitch receiver for identifying a position of the trailer hitch receiver; obtaining with one data gathering device an image from an observation region occupied by a trailer hitch and a trailer hitch receiver; obtaining predetermined vehicle sensor states from a plurality of predetermined vehicle sensors comprising doors closed, reverse gear, vehicle and engine speed, and hatch closed, determining if the vehicle sensor states are acceptable, wherein the doors are closed, the vehicle is in the reverse gear, the vehicle and engine speeds are met, and the hatch is closed, and allowing activation of an alignment process if the vehicle sensor states are acceptable; defining a boundary having an area therein reachable by the trailer hitch to the trailer hitch receiver that can be guided based on a turn radius of the motor vehicle; terminating the alignment process if the vehicle sensor states are unacceptable; verifying that the one target is inside the area defined by the boundary; terminating the alignment process if the one target is outside the area defined by the boundary; analyzing the image of the region occupied by the trailer hitch and the trailer hitch receiver to determine a vertical distance from the one target to the trailer hitch using a pixel count of the image between the trailer hitch and the trailer hitch receiver and to determine a horizontal distance from the one target to a centerline of the motor vehicle using the pixel count of the image; based on motor vehicle turning characteristics and the relative position of the trailer hitch with respect to the trailer hitch receiver, as the motor vehicle moves periodically determining a motor vehicle steer angle to align the trailer hitch and the trailer hitch receiver when backing the motor vehicle; communicating command signals to a motor vehicle steering system based on a then current vehicle steer angle for moving the motor vehicle toward the trailer to at least approximately achieve a predetermined relation between the trailer hitch and the trailer hitch receiver; stopping alignment of the trailer hitch and trailer hitch receiver during automatic or semi-automatic alignment if a user grabs a steering wheel of the motor vehicle, and suspending the alignment until a user reactivates the alignment; and reactivating the alignment by the user with a user activated switch to produce an actuation signal for reactivating the alignment; indicating to a motorist with either an audible indication or a visual indication at least one of when to move, when to brake, when to slow down, and when to stop the motor vehicle during either automatic or semi-automatic alignment; monitoring signals from the motor vehicle to determine an unsafe condition; suspending hitch/receiver alignment of the motor vehicle in response to a determination of an unsafe condition; and indicating to the motorist with either the audible indication or the visual indication that the hitch/receiver alignment has been suspended due to a determination of an unsafe condition.

44. The method of claim 43 additionally comprising stopping movement of the motor vehicle in response to sensing an unsafe condition.

45. The method of claim 43 additionally comprising the step of determining if hitch/receiver is possible and suspending hitch/receiver alignment of the motor vehicle in response to a determination that hitch/receiver alignment is not possible due to movement of the motor vehicle.

46. The method of claim 45 additionally comprising notifying a motorist with either an audible indication or a visual indication when hitch/receiver alignment is no longer possible due to movement of the motor vehicle.

47. The method of claim 43 further comprising sensing an object proximal to the motor vehicle and suspending movement of the motor vehicle in response to the sensing of the object proximal to the motor vehicle.

48. The method of claim 43 wherein one unsafe condition causing the controller to suspend hitch/receiver alignment is based on a sensed steering wheel angle.

49. The apparatus of claim 43 wherein one unsafe condition causing the controller to suspend hitch/receiver alignment is based on sensed motor vehicle speed.

50. The apparatus of claim 43 wherein one unsafe condition causing the controller to suspend hitch/receiver alignment is based on sensed steering wheel torque or power steering motor current.

51. The apparatus of claim 43 wherein one unsafe condition causing the controller to suspend hitch/receiver alignment is based on sensing an open door or hatch.

* * * * *